(12) United States Patent
Huang et al.

(10) Patent No.: US 9,451,302 B2
(45) Date of Patent: Sep. 20, 2016

(54) FUSION DEVICE, SYSTEM AND METHOD FOR IMPLEMENTING INTERNET PROTOCOL TELEVISION SERVICE

(71) Applicant: ZTE Corporation, Shenzhen, Guangdong (CN)

(72) Inventors: Sunliang Huang, Shenzhen (CN); Jianye Chen, Shenzhen (CN); Chengfa Fan, Shenzhen (CN); Hongbiao Li, Shenzhen (CN)

(73) Assignee: ZTE Corporation, Shenzhen, Guangdong (CN)

(*) Notice: Subject to any disclaimer, the term of this patent is extended or adjusted under 35 U.S.C. 154(b) by 0 days.

(21) Appl. No.: 14/436,384

(22) PCT Filed: Sep. 30, 2013

(86) PCT No.: PCT/CN2013/084798
§ 371 (c)(1),
(2) Date: May 14, 2015

(87) PCT Pub. No.: WO2014/059883
PCT Pub. Date: Apr. 24, 2014

(65) Prior Publication Data
US 2015/0264412 A1   Sep. 17, 2015

(30) Foreign Application Priority Data

Oct. 18, 2012  (CN) .......................... 2012 1 0396331

(51) Int. Cl.
*H04N 7/173* (2011.01)
*H04N 21/239* (2011.01)
(Continued)

(52) U.S. Cl.
CPC ...... *H04N 21/2393* (2013.01); *H04N 21/2181* (2013.01); *H04N 21/2183* (2013.01);
(Continued)

(58) Field of Classification Search
CPC .................. H04N 21/2181; H04N 21/23116;
H04N 21/2393; H04N 21/25808; H04N 21/6125; H04N 21/631; H04N 21/64322; H04N 21/64707; H04N 21/2396
USPC .......................... 725/86–100, 118, 119, 127
See application file for complete search history.

(56) References Cited

U.S. PATENT DOCUMENTS

2008/0115167 A1   5/2008 Hermsmeyer et al.
2008/0307108 A1* 12/2008 Yan ..................... H04L 65/1016
709/231
(Continued)

FOREIGN PATENT DOCUMENTS

| CN | WO 2010115331 A1 * | 10/2010 | ....... H04N 21/23103 |
|---|---|---|---|
| CN | 101635635 B | 12/2011 | |
| CN | 102469347 A | 5/2012 | |
| CN | 102946551 A | 2/2013 | |
| WO | 2008054623 A2 | 5/2008 | |

OTHER PUBLICATIONS

Supplementary European Search Report in European application No. 13847213.9, mailed on Sep. 24, 2015.
(Continued)

Primary Examiner — Jeremy Duffield
(74) Attorney, Agent, or Firm — Oppedahl Patent Law Firm LLC

(57) ABSTRACT

Provided are a fusion device, system and method for implementing an Internet Protocol Television (IPTV) service. The fusion device integrates a Content Delivery Network (CDN) component and a network component. The CDN component receives a media service request initiated by a Set Top Box (STB), searches in a service policy template database for a service policy template matching a service type carried by the request, initiate a network support request to the network component, and uses the service policy template to provide a service for the STB after receiving a success response message fed back by the network component; and the network component searches in a network policy template database for a network policy template matching a service policy after receiving the network support request, executes the network policy template, feeds back a success response message when the execution succeeds, and uses the network policy template to provide a network resource support for the CDN component. The disclosure fuses a content delivery function and a network service function, which effectively ensures service quality of the IPTV service.

18 Claims, 6 Drawing Sheets

(51) Int. Cl.
| | |
|---|---|
| *H04N 21/218* | (2011.01) |
| *H04N 21/231* | (2011.01) |
| *H04N 21/258* | (2011.01) |
| *H04N 21/61* | (2011.01) |
| *H04N 21/647* | (2011.01) |
| *H04N 21/24* | (2011.01) |
| *H04N 21/658* | (2011.01) |
| *H04N 21/2183* | (2011.01) |
| *H04N 21/262* | (2011.01) |
| *H04N 21/2665* | (2011.01) |
| *H04N 21/462* | (2011.01) |
| *H04N 21/63* | (2011.01) |
| *H04N 21/643* | (2011.01) |

(52) U.S. Cl.
CPC .... *H04N21/2396* (2013.01); *H04N 21/23116* (2013.01); *H04N 21/2405* (2013.01); *H04N 21/25808* (2013.01); *H04N 21/25866* (2013.01); *H04N 21/2665* (2013.01); *H04N 21/26216* (2013.01); *H04N 21/4622* (2013.01); *H04N 21/6125* (2013.01); *H04N 21/631* (2013.01); *H04N 21/64322* (2013.01); *H04N 21/64707* (2013.01); *H04N 21/6581* (2013.01)

(56) References Cited

U.S. PATENT DOCUMENTS

| | | | |
|---|---|---|---|
| 2009/0041026 A1* | 2/2009 | Hu | H04L 41/044 370/395.21 |
| 2012/0023530 A1* | 1/2012 | Xia | H04N 21/23103 725/93 |
| 2013/0308454 A1* | 11/2013 | Akhtar | H04L 43/0864 370/235 |

OTHER PUBLICATIONS

Content Delivery Network (CDN) architecture—Interconnection with TISPAN IPTV architectures, mailed on Dec. 16, 2009.

NGN integrated IPTV Subsystem Architecture, mailed on Apr. 22, 2009.

Resource and Admission Control Sub-System (RACS): Functional Architecture, mailed on Feb. 9, 2009.

International Search Report in international application No. PCT/CN2013/084798, mailed on Jan. 9, 2014.

English Translation of the Written Opinion of the International Search Authority in international application No. PCT/CN2013/084798, mailed on Jan. 9, 2014.

* cited by examiner

FUSION DEVICE, SYSTEM AND METHOD FOR IMPLEMENTING INTERNET PROTOCOL TELEVISION SERVICE

TECHNICAL FIELD

The disclosure relates to the field of communication technology, and in particular to a fusion device, system and method for implementing an Internet Protocol Television (IPTV) service.

BACKGROUND

The IPTV is a main means and platform of the telecom operators for developing content provision and services; through the IPTV platform, the telecom operators not only provide video services, but also develop a large number of value-added application services. The IPTV is an important way for the telecom operators to achieve the increase of the Average Revenue Per User (ARPU) value of each user and increase the revenue from operations.

With the large-scale development of the IPTV service, for guaranteeing the use experience in service, improving content delivery efficiency and saving network bandwidth, the telecom operators need to deploy a large number of Content Delivery Network (CDN) systems; at the same time, the telecom operators also need to perform a large-scale network upgrade, so as to meet requirements for high bandwidth and high network quality due to development of the IPTV service, which requires a large amount of investments.

However, the CDN and network are independent of each other currently, and both a CDN capability and the network bandwidth may become a bottleneck, influencing the user experience. The telecom operators can only depend on simple network expansion to avoid network congestion; at the same time, the telecom operators construct the CDN in large scale to ensure a carrying capacity of the CDN, so as to guarantee the quality of the self-supported IPTV service, which causes massive wastes of investment. During building, planning and construction of CDN resources and the network resources are performed according to experience points; a situation that the services congest and the services cannot be guaranteed may still occur in an area with a specially concentrated number of users.

Thus, how to implement matching between the CDN capability and the network capability, how to sense the IPTV service of user, how to perform content-level and network-level adjustment and guarantee according to the use of the IPTV service to guarantee the user experience, and how to customize a flexible adjusting policy and give a suggestion on capacity expansion according to the number of users using the IPTV service and the use of resources become the technical problems that require urgent solution at present.

SUMMARY

In view of the above problem, a fusion device, system and method for implementing an IPTV service are provided for overcoming the above problem or at least partially solving the above problem.

According to an aspect of the disclosure, a fusion device for implementing an IPTV service is provided; the fusion device integrates a CDN component and a network component, and an internal communication interface is set between the CDN component and the network component;

the CDN component includes:
a first querying unit, which is configured to receive a media service request initiated by a Set Top Box (STB), and to search in a preconfigured service policy template database for a service policy template matching a service type carried by the media service request; and
a content service unit, which is configured to initiate a network support request to the network component, and to use the queried service policy template to provide a media stream service for the STB after receiving a success response message fed back by the network component;

the network component includes:
a second querying unit, which is configured to search in a preconfigured network policy template database for a network policy template matching a service policy after receiving the network support request; and
a request responding unit, which is configured to execute the network policy template, to feed back a success response message to the CDN component when the execution succeeds, and to use the network policy template to provide a network resource support for the CDN component.

Preferably, in the fusion device of the disclosure, the first querying unit may be further configured to, when receiving the media service request, detect whether the CDN capability is capable of accepting the media service request, and to search in the preconfigured service policy template database when the CDN capability is capable of accepting the media service request.

Preferably, in the fusion device of the disclosure, the first querying unit may be further configured to, when detecting that the CDN is not capable of accepting the media service request, return a failure prompt message, and to record a cause of failure and requested media information; and
the request responding unit is further configured to, when executing the network policy template, return a failure response message when the execution is unsuccessful, and to record a cause of failure and the executed network policy template.

Preferably, in the fusion device of the disclosure, the CDN component also may include a content cancelling acceleration unit, which is configured to, when detecting that the STB closes a media service connection, cancel the service policy template, release resources, and send a policy cancelling request to the network component; and
the network component also may include a network cancelling acceleration unit, which is configured to cancel the network policy template after receiving the policy cancelling request, and to restore the original network policy of a user.

Preferably, in the fusion device of the disclosure, the content service unit may be further configured to send a service start notifying message to an IPTV service system when the content service unit uses the service policy template for providing the media stream service for the STB, and to send a service end notifying message to the IPTV service system when the content cancelling acceleration unit cancels the service policy template.

Preferably, in the fusion device of the disclosure, the CDN component also may include a first information recording unit, which is configured to, after the content cancelling acceleration unit cancels the service policy template, record media content traffic information, the service policy template and a media content of current service of the CDN component; and/or,
the network component also may include a second information recording unit, which is configured to, after the network cancelling acceleration unit cancels the network policy template, record usage duration, used bandwidth and adopted network policy template of current service of the network component.

Preferably, in the fusion device of the disclosure, the content service unit may be further configured to, when using the service policy template for providing the media stream service for the STB, detect whether a media content requested is cached locally; if the media content is cached locally, then to directly deliver the media content to the STB; or else, to request an ancestor content delivery node for the media content according to network layered deployment, and then to deliver the media content to the STB; wherein the ancestor content delivery node is an independent CDN node or the CDN component in the fusion device.

Preferably, in the fusion device of the disclosure, the CDN component may be in a loose coupling relation with the network component.

According to another aspect of the disclosure, a fusion system for implementing an IPTV service is also provided, including an IPTV service system, a CDN centre management system, a network device management system, and a fusion device;

the IPTV service system is configured to receive a user Video On Demand (VOD) request sent by the STB, to acquire user address information carried in the VOD request, to acquire, from a preconfigured mapping relationship database, external service address information of the CDN component of the fusion device matching the user address information, and to send the acquired address information to the STB through an Electronic Program Guide (EPG), namely informing the STB of the fusion device serving the STB; and the CDN centre management system and the network device management system are respectively configured to maintain and manage the CDN component and the network component of the fusion device.

Preferably, in the fusion system of the disclosure, in the IPTV service system, a way of configuring the mapping relationship database may include that:

the network component of the fusion device sends an IPTV user address pool which is maintained by the network component to the CDN component;

after the CDN component receives the IPTV user address pool, the CDN component generates, based on its own CDN service address, a corresponding relationship between the IPTV user address pool and the CDN component, and synchronizes the corresponding relationship to the IPTV service system through the CDN centre management system; and the IPTV service system generates the mapping relationship database by using the corresponding relationship between the IPTV user address pool and the CDN component of each fusion device which is synchronized through the CDN centre management system.

Preferably, in the fusion system of the disclosure, a way of configuring the service policy template database queried by the CDN component in the fusion device and the network policy template database queried by the network component in the fusion device may include that:

the IPTV service system customizes, according to each service type, each service policy template corresponding to each service type, and distributes each service policy template to the CDN centre management system;

the CDN centre management system uses the received each service policy template to generate each service policy template of the CDN system side, and respectively distributes the generated each service policy template to the CDN component of the fusion device and the network device management system;

after the network device management system receives the each service policy template, the network device management system generates each network policy template supporting the each service policy template, and distributes the each network policy template to the network component of the fusion device; and after the CDN component receives the each service policy template, the CDN component generates the service policy template database; after the network component receives the each network policy template, the network component generates the network policy template database.

Preferably, in the fusion system of the disclosure, the IPTV service system may be further configured to record billing information based on the service start notifying message and the service end notifying message which are sent by the fusion device; wherein the billing information includes a media content, request times, and service duration.

Furthermore, the disclosure also provides a fusion method for implementing an IPTV service, including that:

an IPTV service system receives a user VOD request sent by an STB, acquires from a preconfigured mapping relationship database a fusion device matching the user address information after acquiring the user address information carried in the VOD request, and sends information about the acquired fusion device to the STB through an EPG;

the STB initiates a media service request to a CDN component of the fusion device;

after receiving the media service request, the CDN component of the fusion device searches in a preconfigured service policy template database for a service policy template matching the service type carried by the media service request, and initiates a network support request to the network component of the fusion device;

after receiving the network support request, the network component of the fusion device searches in a preconfigured network policy template database for the network policy template matching the service policy, executes the network policy template, feeds back a success response message to the CDN component when the execution successes, and uses the network policy template to provide a network resource support for the CDN component; and after receiving the success response message fed back by the network component, the CDN component of the fusion device uses the service policy template to provide the media stream service for the STB.

The disclosure has the following beneficial effects:

the fusion device, the fusion system and the fusion method of the disclosure enable both network-layer connection and application-layer link of the same user to be on a network device by fusing a CDN function and a network service function; thus, coordination is performed better, and it is easier to guarantee the quality of the IPTV service, and allocation of network bandwidth and deployment of network policy become more flexible. Besides, a better understanding of the service type used by an IPTV user and the demand statistics of CDN resources and network resources is obtained, which provides a real basis for capacity expansion and avoids the problems caused by separation of the CDN from the network that the capabilities do not match each other and cannot meet requirements, and resources are wasted.

DETAILED DESCRIPTION

The technical solutions in embodiments of the disclosure are clearly and completely described below in combination with the accompanying drawings; obviously, the embodiments described are only a part of embodiments of the disclosure instead of all embodiments. Based on the embodiments of the disclosure, all the other embodiments obtained, on the premise of not providing creative work, by the ordinary skilled personnel in the field shall fall within the scope of the claims of the disclosure.

The disclosure provides a fusion device, system and method for implementing an IPTV service for solving the problems in the prior art that the CDN node and the network device are deployed separately, as a result, the CDN capability does not match a network capability, it is unworkable to adjust and guarantee the content level and network level based on use situation of the IPTV service, and it is impossible to provide a flexible adjusting policy and give a suggestion on capacity expansion, thus the quality of the IPTV service is impaired.

The fusion device, the fusion system and the fusion method of the disclosure are elaborated below in combination with several specific embodiments.

Embodiment 1

The present embodiment of the disclosure provides a fusion device for implementing an IPTV service; the fusion device fuses a CDN and a network device together to realize a new-type device; through this fusion device and the IPTV service carrying implemented on the device, an efficient coordination between a use state of the IPTV service of user and the CDN resources and the network resources can be achieved most effectively, and IPTV service experience is guaranteed; meanwhile, it is feasible to according to the CDN resources and the network resources, provide policy adjustment and user access adjustment, optimize utilization of resources and network construction and planning, which greatly improves the quality of the IPTV service.

Figure 1:
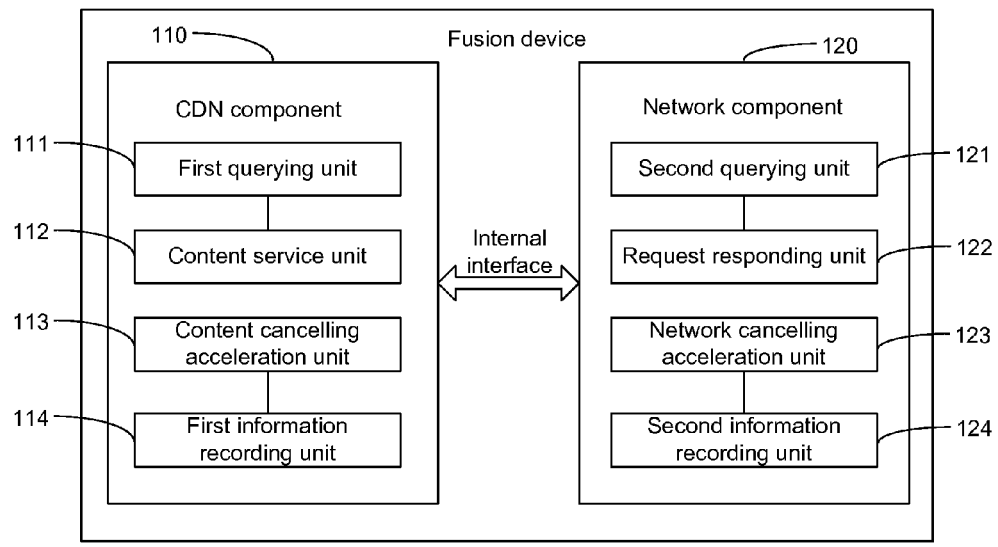
FIG. 1 is a structural diagram of a fusion device for implementing an IPTV service provided by the disclosure.

As shown in FIG. 1, the fusion device in the embodiment of the disclosure integrates a CDN component (equivalent to a CDN node in the CDN network) 110 with a network component 120, and an internal communication interface is set between the CDN component 110 and the network component 120; preferably, the CDN component 110 is in a loose coupling relation with the network component 120.

The CDN component 110 includes:

a first querying unit 111, which is configured to receive a media service request initiated by the STB, and to search in a preconfigured service policy template database for a service policy template matching the service type carried by the media service request; and a content service unit 112, which is configured to initiate a network support request to the network component 120, and to use the service policy template to provide a media stream service for the STB after receiving the success response message fed back by the network component 120;

the network component 120 includes:

a second querying unit 121, which is configured to search in a preconfigured network policy template database for a network policy template matching the service policy after receiving the network support request; and a request responding unit 122, which is configured to execute the network policy template, feed back a success response message to the CDN component 110 when the execution succeeds, and use the network policy template to provide a network resource support for the CDN component 110.

The above is the main structure of the fusion device provided by the disclosure and the way of implementing the IPTV service carrying; some preferable or specific implementing modes of the fusion device in an IPTV service carrying process are described below, involving contents as follows:

optionally, the CDN component 110 also includes a content cancelling acceleration unit 113, which is configured to, when detecting that the STB closes a media service connection, cancel the service policy template, release resources, and send a policy cancelling request to the network component 120; and the network component 120 also includes a network cancelling acceleration unit 123, which is configured to cancel the network policy template after receiving the policy cancelling request.

After the content cancelling acceleration unit 113 and the network cancelling acceleration unit 123 cancel the service policy template and the network policy template, they restore automatically the service policy and the network policy to a previous policy state before the STB requests.

Preferably, the content service unit 112 of the CDN component 110 is further configured to send a service start notifying message to the IPTV service system when the service policy template is used for providing a media stream service for the STB, and to send a service end notifying message to the IPTV service system when the content cancelling acceleration unit cancels the service policy template. That is, in the embodiment of the disclosure, the fusion device informs the IPTV service system when the service starts and ends, so that the IPTV service system bills an STB user accurately.

Optionally, in the embodiment of the disclosure, the fusion can also record related service information in the service process, thereby expanding the billing information of the IPTV service system, providing a more detailed billing list for the user, and providing a basis for a system to call the use situation of the service. Correspondingly, in the fusion device provided by the embodiment of the disclosure:

the CDN component 110 also includes a first information recording unit 114 which is configured to, after the content acceleration unit cancels the service policy template, record information about the media content, the service policy template and media content traffic of current service of the CDN component; and/or, the network component 120 also includes a second information recording unit 124 which is configured to, after the network cancelling acceleration unit cancels the network policy template, record usage duration, used bandwidth and adopted network policy template of current service of the network component.

Preferably, the fusion device provided by the embodiment of the disclosure also has the following characteristics:

in the CDN component 110, the first querying unit 111 is further configured to, when receiving the media service request, detect whether the CDN is capable of accepting the media service request, and if the CDN has such a capability, to search in the service policy template database; wherein the CDN capability is information about the current capability which may influence the CDN component to normally access services, such as resource capability and service type processing capability.

Preferably, the first querying unit 111 is further configured to, when detecting that the current CDN is incapable of accepting the media service request, return a failure prompt message, and to record a cause of failure and the requested media information;

in the network component 120, the request responding unit 122 is further configured to, when the network policy template is executed, return a failure response message if the execution is unsuccessful, and to record a cause of failure and the executed network policy template.

In the embodiment of the disclosure, the first querying unit 111 and the request responding unit 122 record in real time the situation that the CDN component and the network component cannot serve, the specific causes that they cannot serve and parameters of requested services, so as to provide a basis for subsequent capacity expansion.

Preferably, in the CDN component 110, the content service unit 112 is further configured to, when using the service policy template for providing a media stream service for the STB, detect whether the requested media content is cached locally, if cached locally, then to directly deliver the media content to the STB, or else, to request an ancestor content delivery node for the media content according to the network layered deployment, and then to deliver the requested media content to the STB; wherein the ancestor content delivery node is an independent CDN node or the CDN component in the fusion device.

In the embodiment of the disclosure, the CDN component in the fusion device is equal to the external independent CDN node, and can interact, aggregate and coordinate with the external independent CDN node at the same level. The CDN component and the external independent CDN node can also form a multilevel structure, so as to meet networking and service serving requirements in different scenarios.

To sum up, the fusion device in the embodiment of the disclosure integrates the CDN component and the network component, which enables both the network-layer connection and the application-layer link of the user to be on the network device; thus, it is easier to achieve coordination between application and network, and the quality of the IPTV service is guaranteed better.

Embodiment 2

Figure 2:
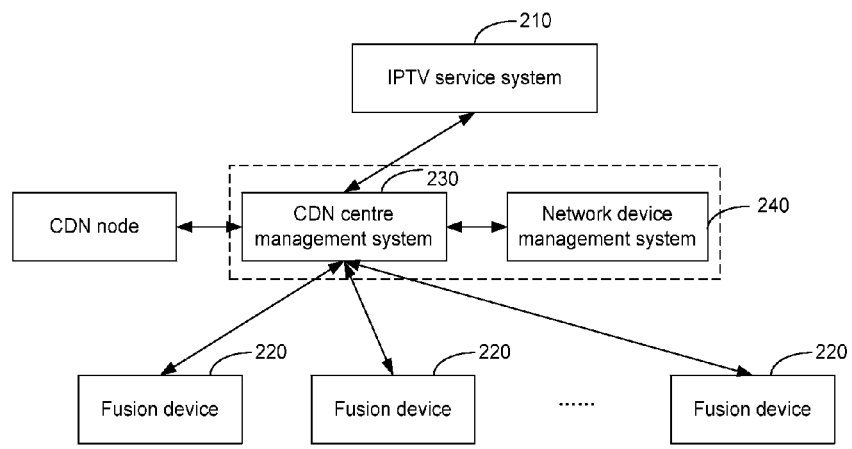
FIG. 2 is a structural diagram of a fusion system for implementing an IPTV service provided by the disclosure.

As shown in FIG. 2, the present embodiment of the disclosure provides a fusion system for implementing an IPTV service, including an IPTV service system 210, a CDN centre management system 230, a network device management system 240 and some fusion devices 220 described in the embodiment 1; in the present embodiment, the way of implementing the IPTV service carrying by the fusion device is described briefly, the specific implementing process refers to the embodiment 1;

the IPTV service system 210 is configured to receive a user VOD request sent by the STB, to acquire user address information carried in the VOD request, to acquire from a preconfigured mapping relationship database a fusion device matching the user address information, and to send the information about the acquired fusion device to an STB through an EPG;

the fusion device 220 includes a CDN component and a network component; the CDN component is configured to receive a media service request initiated by the STB, to search in a preconfigured service policy template database for a service policy template matching the service type carried by the media service request, to initiate a network support request to the network component, and to use the service policy template to provide a service for the STB after receiving a success response message fed back by the network component; and the network component is configured to search in a preconfigured network policy template database for a network policy template matching the service policy after receiving the network support request, to execute the network policy template, to feed back a success response message to the CDN component when the execution succeeds, and to use the network policy template to provide a network resource support for the CDN component.

The CDN centre management system 230 and the network device management system 240 are respectively configured to maintain and manage the CDN component and the network component of the fusion device.

Preferably, except the fusion device which directly provides services for the user, the system provided by the embodiment of the disclosure may also include an independent CDN node which serves as an ancestor/centre node of the fusion device and is used for providing a content support for the fusion device.

The above is the main structure of the fusion device provided by the disclosure and the way of implementing the IPTV service carrying; some preferable or specific implementing modes of the fusion device in the IPTV service carrying process are described below, involving contents as follows:

preferably, in the fusion system, a way of configuring a mapping relation database in the IPTV service system 210 includes that:

the network component of the fusion device 220 sends an IPTV user address pool which is maintained by the network component to the CDN component;

after the CDN component receives the IPTV user address pool, the CDN component generates, based on its own CDN service address, a corresponding relationship between the IPTV user address pool and the CDN component, and synchronizes the corresponding relationship to the IPTV service system 210 through the CDN centre management system 230; and the IPTV service system 210 generates the mapping relationship database by using the corresponding relationship between the IPTV user address pool and the CDN component of each fusion device which is synchronized through the CDN centre management system 230.

Preferably, in the fusion device 220, a way of configuring the service policy template database and the network policy template database includes that:

the IPTV service system 210 customizes, according to each service type, each service policy template corresponding to each service type, and distributes each service policy template to the CDN centre management system 230;

the CDN centre management system 230 uses the received each service policy template to generate each service policy template of the CDN system side, and respectively distributes the generated each service policy template to the CDN component of the fusion device 220 and the network device management system 240; wherein, after the CDN component receives the each service policy template, the CDN component generates the service policy template database;

after the network device management system receives the service policy template, the network device management system generates each network policy template supporting the each service policy template, and distributes the each network policy template to the network component of the fusion device; wherein, after the network component receives the network policy template, the network component generates the network policy template database.

Preferably, in the fusion device provided by the embodiment of the disclosure, the IPTV service system 210 is further configured to record billing information based on a service start notifying message and a service end notifying message which are sent by the fusion device 220; the billing information includes a media content, request times, and service duration.

Preferably, in the fusion device provided by the embodiment of the disclosure, the CDN centre management system 230, a Domain Name System (DNS) server, and a resources scheduling and Global Server Load Balance (GSLB) system are deployed uniformly by a centralized deployment way to implement service adaptation, resources scheduling, management and maintenance and so on of the CDN in this area and the CDN component and the external CDN node in the fusion device; the CDN centre management system 230 may be either deployed as an independent system, or fused with the network device management system 240 to serve as a component of the network device management system, and then be deployed with the network device management system uniformly.

To sum up, the fusion system in the embodiment of the disclosure uses the fusion device which integrates the CDN component and the network component to enable both the network-layer connection and the application-layer link of the user to be on the network device; thus, it is easier to achieve coordination between application and network, and the quality of the IPTV service is guaranteed better.

Embodiment 3

Figure 3:
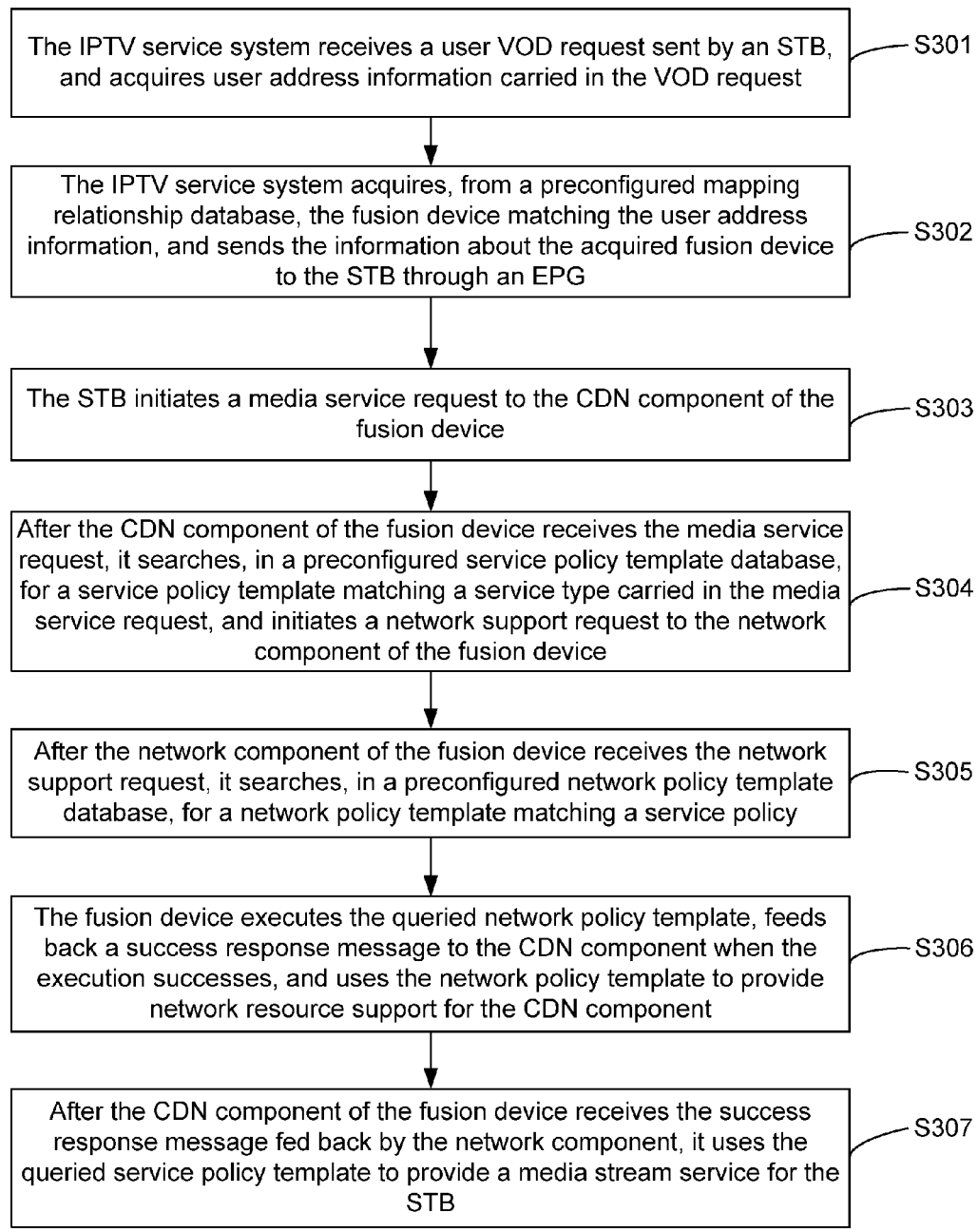
FIG. 3 is a flowchart of a fusion method for implementing an IPTV service provided by the disclosure.

As shown in FIG. 3, the present embodiment of the disclosure provides a fusion method for implementing an IPTV service, including:

Step S301: the IPTV service system receives a user VOD request sent by the STB, and acquires user address information carried in the VOD request;

Step S302: the IPTV service system acquires, from the preconfigured mapping relationship database, the fusion device matching the user address information, and sends the information about the acquired fusion device to the STB through the EPG;

Step S303: the STB initiates a media service request to the CDN component of the fusion device;

Step S304: after the CDN component of the fusion device receives the media service request, it searches, in the preconfigured service policy template database, for a service policy template matching the service type carried in the media service request, and initiates a network support request to the network component of the fusion device;

Step S305: after the network component of the fusion device receives the network support request, it searches, in the preconfigured network policy template database, for a network policy template matching the service policy;

Step S306: the fusion device executes the network policy template, feeds back a success response message to the CDN component when the execution successes, and uses the network policy template to provide a network resource support for the CDN component; and Step S307: after the CDN component of the fusion device receives the success response message fed back by the network component, it uses the service policy template to provide a media stream service for the STB.

Embodiment 4

The present embodiment describes the fusion device in the embodiment 1, the fusion system in the embodiment 2 and the fusion method in the embodiment 3 implement the IPTV service carrying, together, specifically involving contents as follows.

Figure 4:
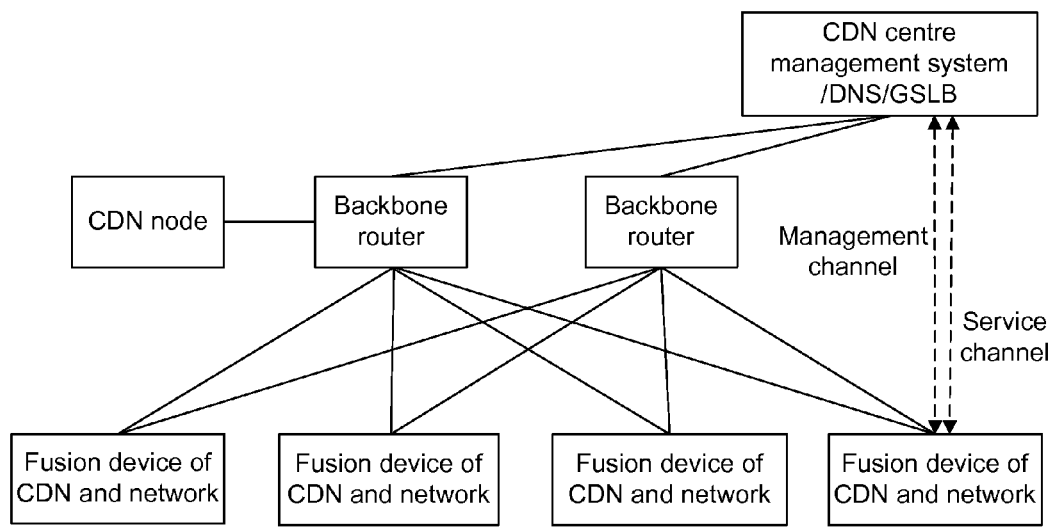
FIG. 4 is a system networking diagram of the fusion device in the disclosure.

FIG. 4 is a system networking diagram of the fusion device in the disclosure. From the system, the fusion devices may be deployed in a distributed manner, but a centre management system is needed to implement unified management and scheduling, and implement unified content management, service monitoring, network management, Domain Name Resolution (DNS), resources scheduling, and Global Server Load Balance (GSLB), and so on.

The fusion device fuses the CDN function and the network function, uses the CDN component as a content delivery node to provide a content delivery service for the user; the fusion device uses the network component to provide network accessing and carrying service for the user. The CDN component and the CDN centre management system establish a management channel and a service channel; the management channel is used for implementing daily maintenance and management of network, device monitoring and so on; the service channel is used for implementing content distribution, service information interaction and so on.

It can be seen from the deployment that, the CDN component can be fused with a core router, a service router (Broadband Remote Access Server (BRAS)/SR), a switcher and other devices in the network. Since the BRAS/SR is a service control point of an IPTV user and has network state information of the user, in the disclosure, the CDN device and the BRAS/SR are fused preferably, thereby achieving coordination between a CDN user state and a network user state; double guarantee of application content of the user and network quality can be achieved through the coordination of the user states, thereby improving the user experience.

From the aspect of networking, the CDN component of the fusion device can be regarded as a CDN node, can be united with an external CDN device for networking, and can be linked at the same level to form a cluster; the CDN component can also form a CDN network with a multilevel structure to meet deployment and service requirements of different scenarios.

The CDN centre management system, the DNS server, and the resources scheduling and GSLB system are deployed uniformly by the centralized deployment way to implement service adaptation, resources scheduling, management and maintenance, and so on of the CDN in this area and the CDN component and the external CDN node in the fusion device; the CDN centre management system may be either deployed as an independent system, or fused with the network device management system of the fusion device to serve as a component of the network device management system, and then be deployed with the network device management system uniformly.

Figure 5:
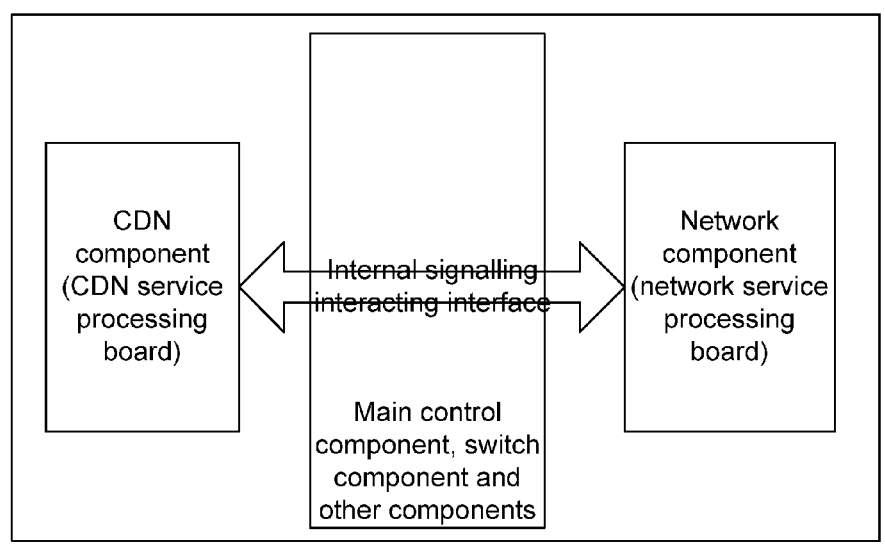
FIG. 5 is an internal structure diagram of the fusion device in the disclosure.

FIG. 5 is a general internal structure diagram of the fusion device. In the embodiment of the disclosure, the fusion device fuses the content delivery node of the CDN with the network device in a loose coupling manner; the CDN component uses an independent CDN service processing board type, and the network component also uses an independent network processing board type; thus, the fusing complexity is reduced greatly, the expandability and flexibility of the system are also improved. The network component and the CDN component can be expanded based on a specific service need.

The CDN component of the fusion device provides an application content delivery service for the user, and maintains a corresponding content state machine for the user and records a content service state of the user while providing the service, which is convenient to implement a fine operation for the user. The CDN component can implement a content acceleration and guarantee policy aiming at the user.

The network component of the fusion device provides a network accessing and carrying service for the user, and maintains a corresponding network state machine for the user and records a network service state of the user while providing the service, which is convenient to implement a fine operation for the user. The network component can implement a network acceleration and guarantee policy aiming at the user.

In the embodiment of the disclosure, for implementing the coordination between the CDN component and the network component, an internal signalling interaction interface is added between the CDN component and the network component; the interacted information includes that: the network component reports a user address pool to the CDN component; the CDN component applies to the network component for user network acceleration and receives a feedback message about execution, a user state query and a feedback, and so on; the coordination of state information and the adjustment of the service policy can guarantee the user experience better.

Figure 6:
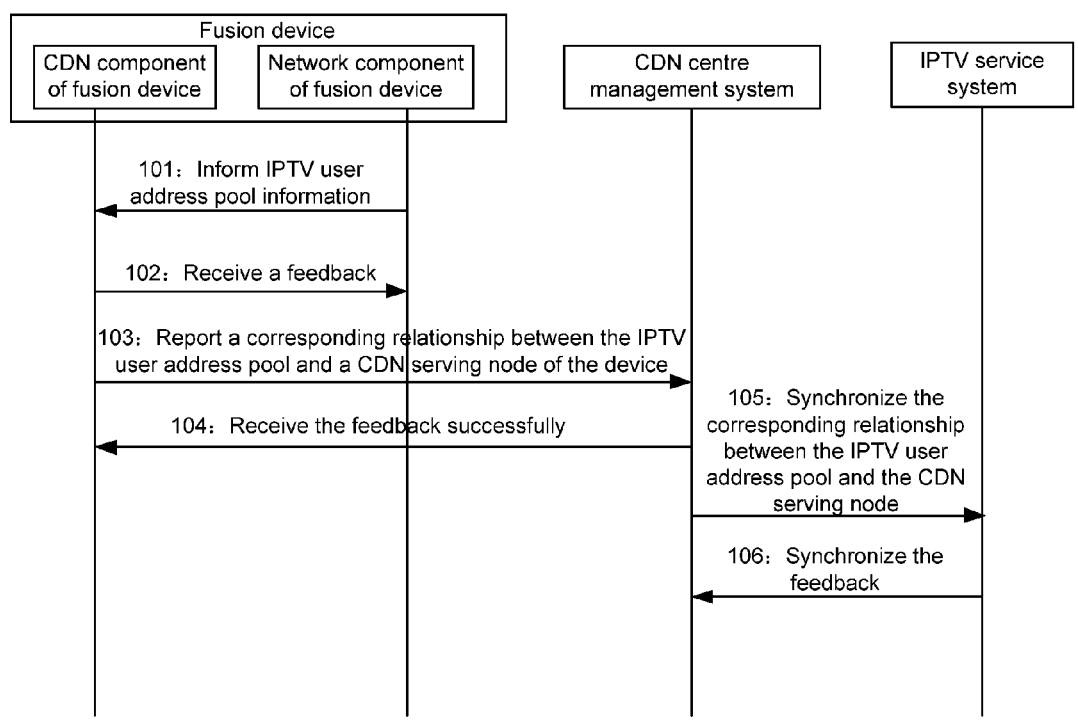
FIG. 6 is a deployment flowchart of a scheduling and locating policy of an IPTV user in the disclosure.

FIG. 6 is a deployment flowchart of a scheduling and locating policy of an IPTV user in the disclosure. In the embodiment of the disclosure, both the network-layer connection and the application-layer link of the IPTV user are located on the same fusion device, the network component of the fusion device provides a network service for the user, and the CDN component of the fusion device provides a content delivery service for the user, so the linkage between the CDN component and the network component can be implemented through the internal interface, the service experience of the IPTV user is guaranteed better, and adjustment is made more flexibly. Thus, a certain policy is needed to schedule and locate the user. In the embodiment of the disclosure, the way of implementing scheduling and location of the fusion device for the IPTV service system specifically includes the following steps:

Step 101: the network component of the fusion device maintains the IPTV user address pool of this device; the network component informs, through the internal interface between the network component and the CDN component, the CDN component of the IPTV user address pool information;

Step 102: the CDN component receives the information about the IPTV user address pool successfully, and sends a reception success message to the network component; if the CDN component receives unsuccessfully, the CDN component sends a reception failure message to the network component, and then the network component re-sends the IPTV user address pool information; after the CDN component receives the IPTV user address pool information of this device successfully, the CDN component generates, in combination with the external service address information of its own CDN node which provides services externally, a record of the corresponding relationship between the IPTV user address pool and the CDN serving node of the fusion device;

Step 103: the CDN component reports information about the record of the corresponding relationship between the IPTV user address pool and the CDN serving node of the fusion device to the CDN centre management system;

Step 104: after the CDN centre management system receives the record successfully, it sends a reception success message to the CDN component of the fusion device; if the CDN centre management system receives the record unsuccessfully, it sends a reception failure message, and then the CDN component of the fusion device resends the record;

Step 105: the CDN centre management system uniformly manages and maintains a database of the corresponding relationship between the IPTV user address pool and the CDN serving node of the fusion device in this network, and synchronizes the database with the IPTV service system; and Step 106: if the information is synchronized successfully, then the IPTV service system sends a synchronization success message to the CDN centre management system; if the information is synchronized unsuccessfully, then it is needed to resynchronize the information.

Information synchronization between the CDN centre management system and the IPTV service system may be performed in batch or in real time; batch synchronization generally means uniform synchronization when the system starts is initially started or when system handover occurs; the real-time synchronization is generally referred to real-time update and synchronization of some recorded information when the IPTV user address pool of a certain fusion device changes and the CDN serving node changes.

After the IPTV system completes the information synchronization, it will have a capability of scheduling and locating the user according to the IPTV user address, which means that the IPTV system can schedule and locate the user according to an Internet Protocol (IP) address of the IPTV user during service authentication of the IPTV user, so as to locate the user to the CDN serving node (namely the CDN component), wherein the CDN serving node and the network connection of the user are on the same fusion device.

Figure 7:
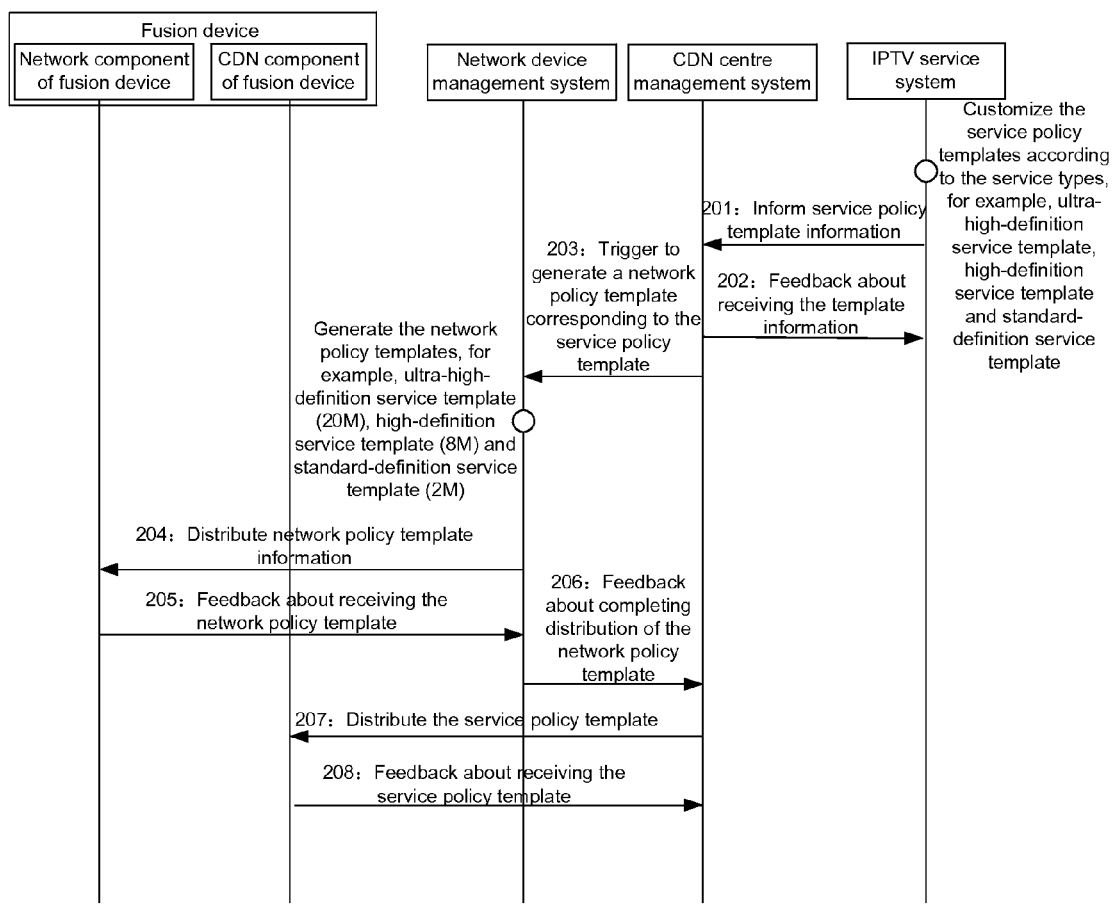
FIG. 7 is a processing flowchart of presetting a service policy and a network policy of the IPTV user in the disclosure.

FIG. 7 is a processing flowchart of presetting a service policy and a network policy of the IPTV user in the disclosure. In this system, the user can be provided with different services, such as ultra-high definition, high definition and standard definition; the different services have different requirements on content delivery, and bandwidth and quality of the network, so different service polices and network polices are needed for guarantee, and it is needed to deploy corresponding service policies and network policies; this system makes a judgment on the service access of the user through the CDN component, and applies a corresponding policy, so it is needed to deploy the corresponding service policies and network policies in advance;

the IPTV service system customizes corresponding service policy templates according to service categories and service types provided by itself; here, it is supposed that there are three service policy templates, which are respectively ultra-high definition, high definition and standard definition, then the following steps are included:

Step 201: after the IPTV service system customizes the corresponding service policy templates, it informs the CDN centre management system of information about the service policy templates;

Step 202: after the CDN centre management system receives the information about the service policy templates successfully, it sends a reception success message to the IPTV service system, and generates, according to the received information about the service policy templates, corresponding ultra-high-definition, high-definition and standard-definition service policy templates of the CDN system by combing its own requirements for CDN service and for deployment implementation; that is, after the CDN centre management system receives the service policy templates customized by the IPTV service system, CDN centre management system generates, according to a requirement for service policy, the service policy templates which can be run by the CDN centre management system; that is, the CDN centre management system sets local parameters and sets a method for implementing the service policies according to the service policy templates customized by the IPTV service system. Of course, such conversion belongs to a technology known well by the skilled in the field, so it will not be repeated here;

Step 203: the CDN centre management system sends a message to the network device management system to request the network device management system to generate the corresponding network policy templates aiming at the service policy templates;

Step 204: the network device management system generates the corresponding network policy templates according to the request, such as an ultra-high-definition network policy template with guaranteed bandwidth of 20M, a high-definition network policy template with guaranteed bandwidth of 8M, and a standard-definition network policy template with guaranteed bandwidth of 2M; after the network device management system generates the corresponding network policy templates, it distributes these templates to the network component of each fusion device;

Step 205: after the network component of the fusion device receives the network policy templates successfully, it sends a reception success message to the network device management system;

Step 206: after the network device management system distributes the network policy templates to fusion devices successfully, it sends a completion message to the CDN centre management system;

Step 207: after the CDN centre management system receives the completion message indicating that distribution of the network policy templates is completed, it distributes the service policy templates to the CDN component of each fusion device; and Step 208: after the CDN components of the fusion devices receives the service policy templates successfully, the CDN components send the reception success messages to the CDN centre management system;

until now, the corresponding network policy templates are deployed on the network component of the fusion device, and the corresponding service policy templates are deployed on the CDN component of the fusion device.

Figure 8:
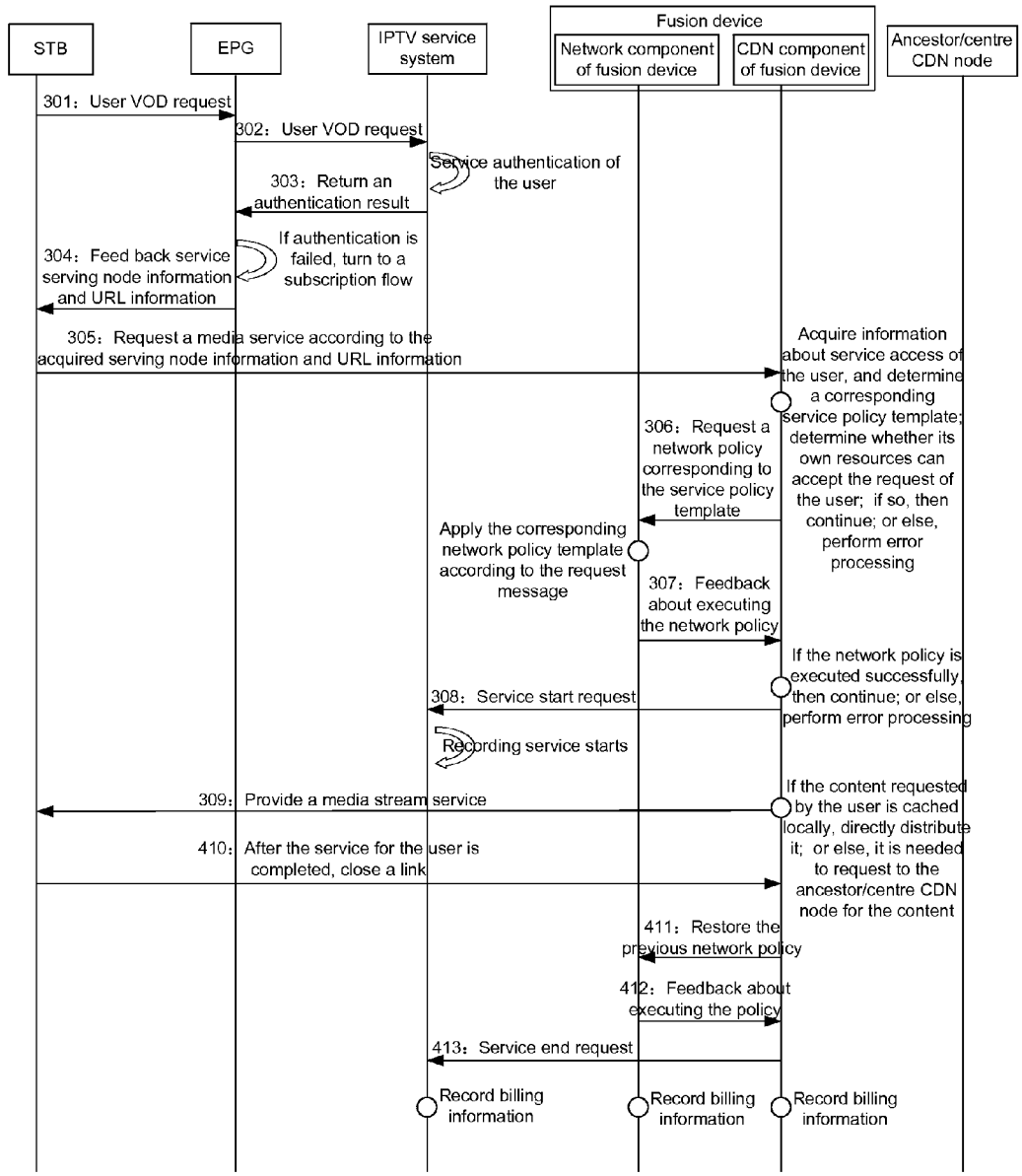
FIG. 8 is a specific flowchart of the fusion device implementing the IPTV service in the disclosure.

Based on the deployment of the IPTV user scheduling and locating policy, and the presetting of the service policy and the network policy of the IPTV user, the processing flow of implementing the IPTV service by the fusion device is elaborated below; as shown in FIG. 8, in the processing flow, the involved system mainly includes the STB, the EPG, the IPTV service system, the fusion device and the ancestor/centre CDN node; the specific steps of implementing the service are as follows:

Step 301: when the user needs to order an IPTV service, the STB sends a VOD request of the user to the EPG system;

Step 302: the EPG sends the VOD request of the user to the IPTV service system;

Step 303: the IPTV service system performs the service authentication on the user to query whether the user subscribes this service and whether the user has authority to watch; if the user has authority to watch, then the information about the record of the corresponding relationship between the IPTV user address pool and the CDN serving node is employed for acquiring the fusion device serving the STB, and the information about the fusion device is sent to the EPG through an authentication success response message or a separate message; if the user does not have authority to watch, an authentication failure response message is fed back;

Step 304: the EPG system receives a user authentication feedback message sent by the IPTV service system; if the user is unauthenticated, then the EPG system turns to a service subscribing flow; if the user is authenticated, then the EPG system feeds back service serving node information and Uniform Resource Locator (URL) information to the STB based on the information about the servable fusion device which is sent by the IPTV service system, wherein the serving node is the fusion device;

Step 305: the STB sends a media service request to the fusion device according to the acquired serving node information and URL information;

Step 306: the CDN component of the fusion device receives an access request from the user, and then determines, according to its own judgment, whether the CDN component has enough CDN capability to provide a content delivery service for the user; if it has such a CDN capability, then it accepts the request of the user; otherwise, it performs error processing; when an error occurs, the CDN component records corresponding information, such as insufficient CDN resource and the types of applications accessed by the user, and performs corresponding statistics and summarization, which is convenient for providing a basis for the subsequent capacity expansion; if the CDN component accepts the request of the user, then it determines to correspond to the corresponding service policy template according to the types of applications accessed by the user, such as ultra-high-definition video, high-definition video and standard-definition video, and requests to, through the internal interface, the network component for the network policy corresponding to the service policy template according to the corresponding service policy template to request network guarantee;

Step 307: the network component receives a network guarantee policy request from the user, corresponds to the corresponding network policy template according to the information about the service policy template in the request, applies the corresponding network policy template, and feeds an execution result message back to the CDN component; if the network policy is executed successfully, it is indicated that the network resources can guarantee the services of the user, and this flow is continued; if the network policy is executed unsuccessfully, error processing is performed; the cause of error may be the insufficiency of network resources, at this point, corresponding recording and statistics processing can be performed, which provides a basis for the subsequent capacity expansion;

Step 308: now, deployment of the service policy and the network policy can guarantee the IPTV service of the user, and can also start to carry out service; the CND component of the fusion device sends a service start request to the IPTV service system; the IPTV service system receives the request message, then records that service starts; and the IPTV service system starts to serve the user;

Step 309: the CDN system component starts to provide a media delivery service to the user; the CDN component detects whether the media content requested by the user is cached locally; if cached locally, then the CDN component directly delivers the media content to the user; or else, the CDN component needs to request an ancestor/centre CDN node for the media content, and then delivers the acquired media content to the user;

in the process, the coordination between the CDN component of the fusion device and the external CDN node is achieved and forms a multilevel CDN structure; the upward content acquirement of the fusion device depends on the dependency and networking structure of the CDN. The ancestor/centre CDN node returns the corresponding media content according to the content request of the fusion device;

Step 410: in the process, the user gets the continuous media content service until the service is provided completely or the user switches programs, and then the STB closes the media service link; a message of closing link will trigger a request of closing a user content state machine which is maintained in the CDN component of the fusion device; before the state machine is closed, it is needed to cancel the corresponding policy of this service; in the CDN component, the service policy template of this service is cancelled, and the related resources are released;

Step 411: the CDN component requests to, through the internal interface, the network component to cancel the network policy of this IPTV service and to restore the previous network policy of the user;

Step 412: after the network component receives the policy cancelling request from the CDN component, it cancels the network policy of this IPTV service, restores the previous network policy of the user and feeds back an execution result to the CDN component; and Step 413: after the CDN component cancels the network policy of this IPTV service of the network component, it sends a service ending request to the IPTV service system, and closes the state machine of the user; after the IPTV service system receives the service ending request, the recording service ends.

On the aspect of billing, it is feasible to bill in the IPTV service system, bill in the network component of the fusion device, bill in the CDN component of the fusion device, or bill in a combined way according to the specific implementation requirements; the IPTV service system records the content, the number of times and the duration used by the user and other information; the network component of the fusion device records network usage, bandwidth usage, network policy, network duration, traffic and other specific information; the CDN component of the fusion device records content usage, content policy, content traffic and other specific information.

It can be seen from the above specific process of implementing the IPTV service that the fusion device, the fusion system and the fusion method of the disclosure have the following characteristics:

(1) the network system and the CDN system exist as the components of the system device, form a loose coupling structure and realize fusion at the device level;

(2) both the network component and the CDN component have their own user state machines, and their state machines are independent of each another;

(3) the network component and the CDN component maintain the network state machine and the content state machine of the user respectively, which is convenient to implement the fine operation and service guarantee for the user;

(4) the network component and the CDN component interact with each other through an internal system interface and a message interface, so that the network capability and the CDN content service capability can coordinate with each other;

(5) the CDN component is managed by the unified CDN centre management system; the CDN centre management system can be either set independently, or integrated into the network management system of the fusion device as an integral part of the network management system;

(6) the network component informs, through the internal interface, the CDN component of the IPTV user address pool information of the device;

(7) the CDN component of the fusion device generates a record of a corresponding relationship between the local IPTV address pool and the local CDN serving node;

(8) the CDN component of the fusion device reports the record of the corresponding relationship between the local IPTV address pool and the local CDN serving node to the CDN centre management system;

(9) the CDN centre management system maintains the corresponding database according to the record of the corresponding relationship between the IPTV address pool and the CDN serving node which is reported by each fusion device, and synchronizes the database to the IPTV service system;

(10) the IPTV service system generates the corresponding service policy template according to the service type provided by itself, and distributes the service policy template to the CDN centre management system;

(11) the CDN centre management system requests the network device management system to generate the network policy template corresponding to the service policy template;

(12) when the IPTV service system performs service authentication on the user, if the authentication is successful, the IPTV service system schedules according to the information about the user address and the CDN serving node, determines which CDN component of the fusion device will serve the user, and includes information about a scheduling result into an authentication success response message and return them together;

(13) the CDN component of the fusion device performs resource determination to determine whether there are enough CDN resources meeting the request of the user; if there are enough CDN resources, then the CDN component accepts the request of the user; or else, it performs error processing;

(14) the CDN component of the fusion device performs service request determination to determine a corresponding service policy template;

(15) the CDN component of the fusion device requests to, through the internal interface, the network component for the responded network policy guarantee;

(16) the network component of the fusion device can apply the corresponding network policy template according to the request of the CDN component;

(17) the application of the user is completed, then closing the application link will trigger change of the user state machine of the CDN component;

(18) the CDN component of the fusion device can request to the network component to cancel the network policy template corresponding to the service policy template, and to restore the previous network policy of the user;

(19) the method for implementing the IPTV service is based on the new-type device which fuses CDN and network; the CDN component of the fusion device which mixes CDN and network creates the application link with the user and provides the services; and

(20) the method for implementing the IPTV service based on the fusion device which mixes CDN and network enables both the network-layer connection and the application-layer link of the user to be on the network device, so that it is easier to achieve the coordination between application and network, and the quality of the IPTV service is guaranteed better.

To sum up, the disclosure implements the IPTV service based on the fusion device, and makes both the network-layer connection and the application-layer link of the same user on the network device; thus, coordination can be performed better, it is easier to achieve the quality guarantee of the IPTV service, and the allocation of network bandwidth and the deployment of network policy become more flexible. Besides, a better understanding of the service type used by the IPTV user and the demand statistics of CDN resources and network resources is obtained, which provides a real basis for capacity expansion and avoids the problems caused by separation of the CDN and the network that the capabilities do not match each other and cannot meet requirements, and resources are wasted.

The disclosure fuses the network device and the CDN device together to form a new-type device and adopts a loose coupling fusing way, which is easier to deploy and expand. The content state machine and the network state machine of the user are respectively maintained at the CDN component and the network component, and an internal interacting interface is added between the CDN component and the network component, so that the coordination of states is achieved, and the basis of the fine operation and the service guarantee for the user is provided. On this basis, the method for implementing the IPTV service is provided, which carries IPTV applications based on the fusion device of CDN and network, and makes both the application-layer link and the network-layer link of the IPTV applications on the fusion device, so that better coordination and cooperation can be achieved; deploying the corresponding service policy and network policy, and implementing the correspondence and linkage between the service policy and the network policy can provide guarantee of high quality of service for the IPTV service, and makes the allocation of network bandwidth and the deployment of network policy more flexible.

Obviously, those skilled in the field can make various modifications and variations to the disclosure without departing from the spirit and scope of the disclosure. Thus, if these modifications and variations of the disclosure fall within the scope of the claims of the disclosure and equivalent technologies thereof, the disclosure is also intended to include these modifications and variations.

INDUSTRIAL APPLICABILITY

The disclosure makes both the network-layer connection and the application-layer link of the same user on the network device by fusing the CDN content delivery function and the network service function; thus, the coordination is performed better, it is easier to achieve the quality guarantee of the IPTV service, and the allocation of network bandwidth and the deployment of network policy become more flexible. Besides, a better grasp on the service type used by the IPTV user and the demand statistics of the CDN resources and network resources is obtained, which provides a real basis for capacity expansion and avoids the problems caused by separation of the CDN and the network that the capabilities do not match each other and cannot meet requirements, and resources are wasted.

What is claimed is:

1. A fusion device for implementing an Internet Protocol Television (IPTV) service, integrating a Content Delivery Network (CDN) component and a network component; wherein an internal communication interface is set between the CDN component and the network component;

the CDN component comprises:
    a first querying unit, which is configured to receive a media service request initiated by a Set Top Box (STB), and to search in a preconfigured service policy template database for a service policy template matching a service type carried by the media service request; and
    a content service unit, which is configured to initiate a network support request to the network component, and to use the service policy template to provide a media stream service for the STB after receiving a success response message fed back by the network component;

the network component comprises:
    a second querying unit, which is configured to search in a preconfigured network policy template database for a network policy template matching a service policy after receiving the network support request; and
    a request responding unit, which is configured to execute the network policy template, to feed back a success response message to the CDN component when the execution succeeds, and to use the network policy template to provide a network resource support for the CDN component;

wherein the CDN component also comprises a content cancelling acceleration unit which is configured to, when detecting that the STB closes a media service connection, cancel the service policy template, release resources, and send a policy cancelling request to the network component; and the network component also comprises a network cancelling acceleration unit which is configured to cancel the network policy template after receiving the policy cancelling request.

2. The fusion device according to claim 1, wherein the first querying unit is further configured to, when receiving the media service request, detect whether the CDN capability is capable of accepting the media service request, and to search in the preconfigured service policy template database when the CDN capability is capable of accepting the media service request.

3. The fusion device according to claim 2, wherein the first querying unit is further configured to, when detecting that the CDN is not capable of accepting the media service request, return a failure prompt message, and to record a cause of failure and requested media information; and the request responding unit is further configured to, when executing the network policy template, return a failure response message when the execution is unsuccessful, and to record a cause of failure and the executed network policy template.

4. The fusion device according to claim 1, wherein the content service unit is further configured to send a service start notifying message to an IPTV service system when the content service unit uses the service policy template for providing the media stream service for the STB, and to send a service end notifying message to the IPTV service system when the content cancelling acceleration unit cancels the service policy template.

5. The fusion device according to claim 1, wherein the CDN component also comprises a first information recording unit which is configured to, after the content cancelling acceleration unit cancels the service policy template, record media content traffic information, the service policy template and a media content of current service of the CDN component; and/or, the network component also comprises a second information recording unit which is configured to, after the network cancelling acceleration unit cancels the network policy template, record usage duration, used bandwidth and adopted network policy template of current service of the network component.

6. The fusion device according to claim 1, wherein the content service unit is further configured to, when using the service policy template for providing the media stream service for the STB, detect whether a media content requested is cached locally; if the media content is cached locally, then to directly deliver the media content to the STB; or else, according to network layered deployment, to request an ancestor content delivery node for the media content, and then to deliver the media content to the STB; wherein the ancestor content delivery node is an independent CDN node or the CDN component in the fusion device.

7. The fusion device according to claim 1, wherein the CDN component is in a loose coupling relation with the network component.

8. A fusion system for implementing an Internet Protocol Television (IPTV) service, comprising an IPTV service system, a Content Delivery Network (CDN) centre management system, a network device management system, and a fusion device;

the IPTV service system is configured to receive a user Video On Demand (VOD) request sent by a Set Top Box (STB), to acquire user address information carried in the VOD request, to acquire, from a mapping relationship database which is preconfigured, the fusion device matching the user address information, and send information about the acquired fusion device to the STB through an Electronic Program Guide (EPG);

the CDN centre management system and the network device management system are respectively configured to maintain and manage a CDN component and a network component of the fusion device;

wherein the fusion device integrates the CDN component and the network component, and an internal communication interface is set between the CDN component and the network component;

the CDN component comprises:

a first querying unit, which is configured to receive a media service request initiated by the STB, and to search in a service policy template database for a service policy template matching a service type carried by the media service request; and a content service unit, which is configured to initiate a network support request to the network component, and to use the service policy template to provide a media stream service for the STB after receiving a success response message fed back by the network component;

the network component comprises:

a second querying unit, which is configured to search in a network policy template database for a network policy template matching a service policy after receiving the network support request; and a request responding unit, which is configured to execute the network policy template, to feed back a success response message to the CDN component when the execution succeeds, and to use the network policy template to provide a network resource support for the CDN component;

wherein the CDN component also comprises a content cancelling acceleration unit which is configured to, when detecting that the STB closes a media service connection, cancel the service policy template, release resources, and send a policy cancelling request to the network component; and the network component also comprises a network cancelling acceleration unit which is configured to cancel the network policy template after receiving the policy cancelling request.

9. The fusion system according to claim 8, wherein a way of configuring the mapping relationship database in the IPTV service system comprises that:

the network component of the fusion device sends an IPTV user address pool which is maintained by the network component to the CDN component;

after the CDN component receives the IPTV user address pool, the CDN component generates, based on its own CDN service address, a corresponding relationship between the IPTV user address pool and the CDN component, and synchronizes the corresponding relationship to the IPTV service system through the CDN centre management system; and the IPTV service system generates the mapping relationship database by using the corresponding relationship between the IPTV user address pool and the CDN component of each fusion device which is synchronized through the CDN centre management system.

10. The fusion system according to claim 8, wherein a way of configuring the service policy template database queried by the CDN component in the fusion device and the network policy template database queried by the network component in the fusion device comprises that:

the IPTV service system customizes, according to each service type, each service policy template corresponding to each service type, and distributes each service policy template to the CDN centre management system;

the CDN centre management system uses the received each service policy template to generate each service policy template of the CDN system side, and respectively distributes the generated each service policy template to the CDN component of the fusion device and the network device management system;

after the network device management system receives the each service policy template, the network device management system generates each network policy template supporting the each service policy template, and distributes the each network policy template to the network component of the fusion device; and after the CDN component receives the each service policy template, the CDN component generates the service policy template database; after the network component receives the each network policy template, the network component generates the network policy template database.

11. The fusion system according to claim 8, wherein the IPTV service system is further configured to record billing information based on a service start notifying message and a service end notifying message which are sent by the fusion device, wherein the billing information comprises a media content, request times, and service duration.

12. A fusion method for implementing an Internet Protocol Television (IPTV) service which is applied to a fusion system which comprises an IPTV service system, a Content Delivery Network (CDN) centre management system, a network device management system, and a fusion device integrates a CDN component and a network component; the fusion method comprising:

receiving, by the IPTV service system, a user Video On Demand (VOD) request sent by a Set Top Box (STB), acquiring from a preconfigured mapping relationship database the fusion device matching the user address information after acquiring the user address information carried in the VOD request, and sending information about the fusion device to the STB through an Electronic Program Guide (EPG);

initiating, by the STB, a media service request to the CDN component of the fusion device;

searching, by the CDN component of the fusion device, in a preconfigured service policy template database, for a service policy template matching a service type carried by the media service request after the CDN component receives the media service request, and initiating a network support request to the network component of the fusion device;

searching, by the network component of the fusion device, in a preconfigured network policy template database, for a network policy template matching a service policy after the network component receives the network support request, executing the network policy template, feeding back a success response message to the CDN component when the execution successes, and using the network policy template to provide a network resource support for the CDN component; and using, by the CDN component of the fusion device, the service policy template to provide a media stream service for the STB, after the CDN component receives the success response message fed back by the network component;

when detecting that the STB closes a media service connection, cancelling, by the CDN component of the fusion device, the service policy template, release resources, and sending a policy cancelling request to the network component of the fusion device; and cancelling, by the network component of the fusion device, the network policy template after receiving the policy cancelling request.

13. The fusion device according to claim 4, wherein the CDN component also comprises a first information recording unit which is configured to, after the content cancelling acceleration unit cancels the service policy template, record media content traffic information, the service policy template and a media content of current service of the CDN component; and/or, the network component also comprises a second information recording unit which is configured to, after the network cancelling acceleration unit cancels the network policy template, record usage duration, used bandwidth and adopted network policy template of current service of the network component.

14. The fusion system according to claim 8, wherein the first querying unit is further configured to, when receiving the media service request, detect whether the CDN capability is capable of accepting the media service request, and to search in the preconfigured service policy template database when the CDN capability is capable of accepting the media service request.

15. The fusion system according to claim 14, wherein the first querying unit is further configured to, when detecting that the CDN is not capable of accepting the media service request, return a failure prompt message, and to record a cause of failure and requested media information; and the request responding unit is further configured to, when executing the network policy template, return a failure response message when the execution is unsuccessful, and to record a cause of failure and the executed network policy template.

16. The fusion system according to claim 8, wherein the content service unit is further configured to send a service start notifying message to the IPTV service system when the content service unit uses the service policy template for providing the media stream service for the STB, and to send a service end notifying message to the IPTV service system when the content cancelling acceleration unit cancels the service policy template.

17. The fusion system according to claim 8, wherein the CDN component also comprises a first information recording unit which is configured to, after the content cancelling acceleration unit cancels the service policy template, record media content traffic information, the service policy template and a media content of current service of the CDN component; and/or, the network component also comprises a second information recording unit which is configured to, after the network cancelling acceleration unit cancels the network policy template, record usage duration, used bandwidth and adopted network policy template of current service of the network component.

18. The fusion system according to claim 8, wherein the content service unit is further configured to, when using the service policy template for providing the media stream service for the STB, detect whether a media content requested is cached locally; if the media content is cached locally, then to directly deliver the media content to the STB; or else, according to network layered deployment, to request an ancestor content delivery node for the media content, and then to deliver the media content to the STB; wherein the ancestor content delivery node is an independent CDN node or the CDN component in the fusion device.

* * * * *